3,186,168
MEANS FOR SUPPORTING THE DOWNSTREAM END OF A COMBUSTION CHAMBER IN A GAS TURBINE ENGINE
Alan Ormerod, Oswaldtwistle, near Church, and Arthur S. Kay, Clitheroe, England, assignors to Joseph Lucas (Industries) Limited, Birmingham, England
Filed Sept. 9, 1963, Ser. No. 307,721
Claims priority, application Great Britain, Sept. 11, 1962, 34,650/62
3 Claims. (Cl. 60—39.32)

This invention relates to means for supporting the downstream end of a combustion chamber in a gas turbine engine, the means being of the kind incorporating a support ring of U-shaped cross-section having an inner limb secured to the combustion chamber and an outer limb slidable in a groove in the turbine casing.

According to the invention, in means of the kind specified the inner limb of the support ring is formed with longitudinally extending corrugations, the inner crests of which are secured to the combustion chamber.

Figure 1:
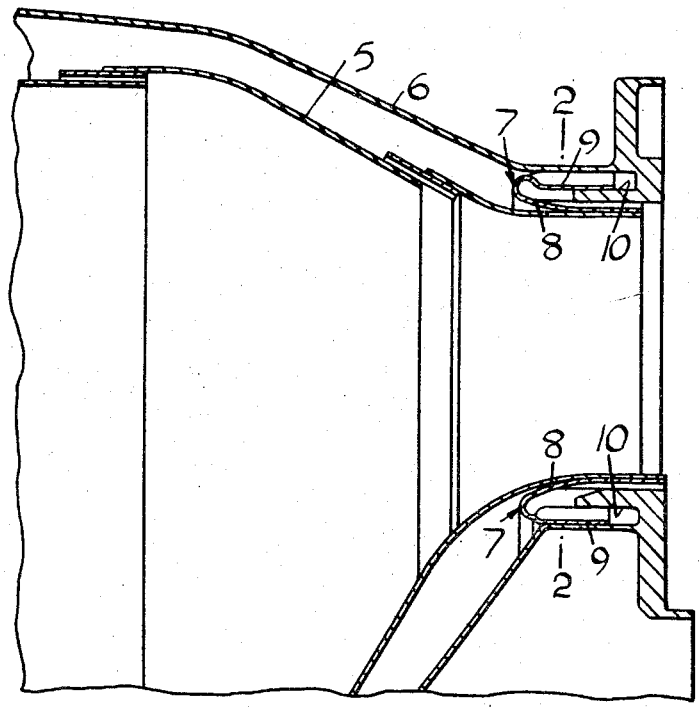
Figure 2:
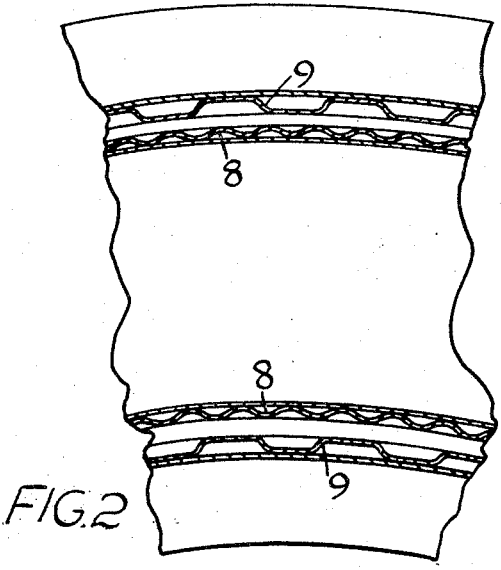

In the acompanying drawings, FIGURE 1 is a sectional view illustrating sufficient of one example for an understanding of the invention, and FIGURE 2 is a section on the line 2—2 in FIGURE 1.

Referring to the drawings, there is shown part of an annular combustion chamber 5 which is supported in the casing 6 of a gas turbine engine. The invention is concerned solely with the support for the downstream end of the chamber 5, and the other details of the gas turbine engine are known per se and are not illustrated.

The downstream end of the chamber 5 is supported by a pair of short cylindrical rings 7 which are bent to U-shaped cross-section so that each ring includes inner and outer limbs 8, 9 which are formed with longitudinally extending corrugations. The outer limbs 9 slide in slot 10 in the casing 6, and the inner crests of the inner limbs 8 are welded or otherwise secured to the chamber 5. The outer crests of the limbs 8 slide on part of the casing 6.

As shown in FIGURE 2, it is preferred that the circumferential spacing of the corrugations on the limbs 9 be greater than the circumferential spacing of the corrugations on the limbs 8. Moreover, considered in cross section, the central portion of each ring is plane, and the height of the corrugations on the inner limbs 8 tapers towards the plane portion as shown in FIGURE 1 so that there is no abrupt change in section between the plane portions and the limbs 8.

By a construction as above describe, air can flow to the turbine throgh the corrugations in the inner limbs 8, without the necessity of weakening the rings 7 by forming holes therein. Moreover, by virtue of the corrugations on the outer limbs 9, risk of seizure of the rings 7 in the grooves 10 is minimised.

It will be appreciated that where the combustion chamber is cylindrical, only one support ring will be required.

Having thus described our invention what we claim as new and desire to secure by Letters Patent is:

1. Means for supporting the downstream end of a combustion chamber in a gas turbine engine, comprising a support ring of U-shaped cross-section having an inner limb secured to the combustion chamber and an outer limb slidable in a groove in the turbine casing, said inner limb of the support ring being formed with longitudinally extending corrugations.

2. Means as claimed in claim 1 in which the outer limb is also formed with longitudinally extending corrugations.

3. Means as claimed in claim 2 in which the part of the ring between the corrugations on the inner and outer limbs is plane, and the height of the corrugations on the inner limb tapers towards the plane portion.

References Cited by the Examiner
UNITED STATES PATENTS

| | | | |
|---|---|---|---|
| 2,625,013 | 1/53 | Howard | 60—39.32 |
| 2,699,040 | 1/55 | Gaubatz | 60—39.65 |
| 2,996,884 | 8/61 | Johnson | 60—39.65 |

SAMUEL LEVINE, *Primary Examiner.*